Jan. 21, 1941.   H. S. JANDUS   2,229,505
BUMPER STRUCTURE
Filed Sept. 1, 1939   2 Sheets-Sheet 2

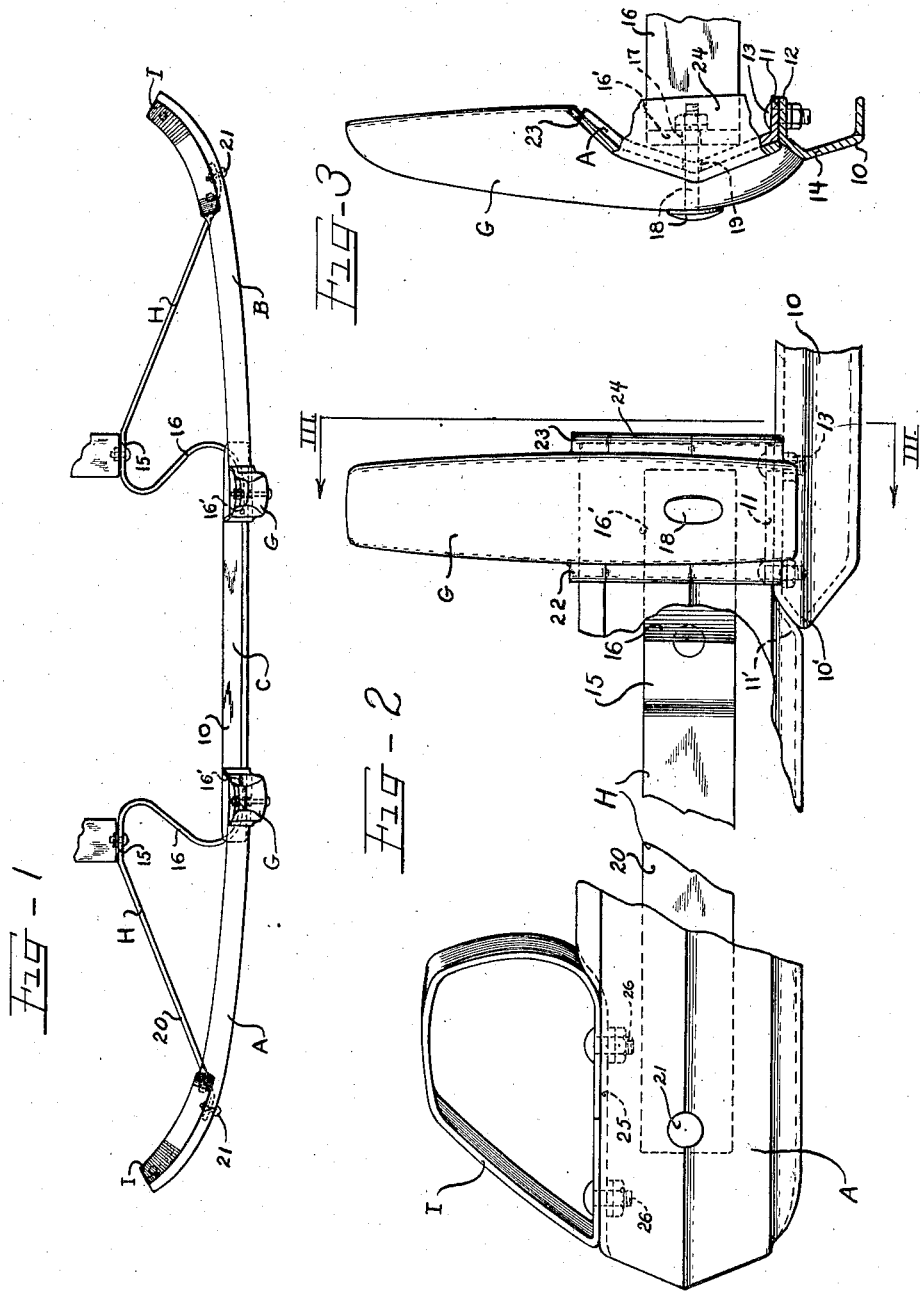

Inventor
HERBERT S. JANDUS
by Charles Allen Attys

Patented Jan. 21, 1941

2,229,505

UNITED STATES PATENT OFFICE 2,229,505

BUMPER STRUCTURE

Herbert S. Jandus, Detroit, Mich., assignor to Houdaille-Hershey Corporation, Detroit, Mich., a corporation of Michigan Application September 1, 1939, Serial No. 292,968

4 Claims. (Cl. 293—55)

This invention relates to bumper structure for automobiles, the object being to provide an improved bumper assembly for adequately protecting the vehicle against bumps and particularly to afford adequate protection against bumps which might result in injury to the radiator grille and the radiator.

The invention relates particularly to that type of bumper structure in which bumper end portions are of substantial vertical width, and are connected by middle bumper bars arranged to protect the radiator grille without interfering with adequate and proper air flow to the radiator.

An important feature of the invention resides in improved arrangement for securing middle impact bars to the bumper end impact portions.

A further feature of the invention resides in simplified structure and arrangement whereby guard members may be readily mounted on the end impact portions to afford protection for the vehicle fenders and lamps.

Another important feature resides in the arrangement of the bumper assembly supports for supporting it on the vehicle, the arrangement being such that more resistance will be assured against blows along the middle portion of the assembly to stiffen and strengthen it against rearward displacement which might cause engagement thereof with the radiator grille and injury to the grille or radiator.

Figure 4:
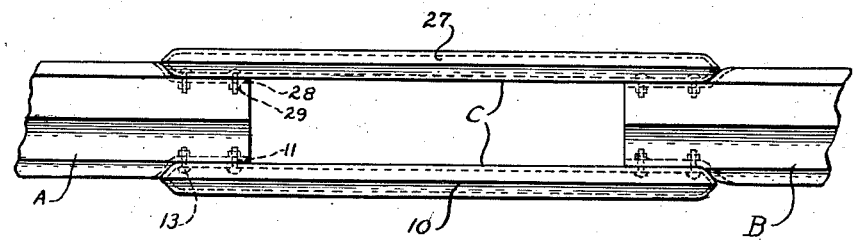
Figure 5:
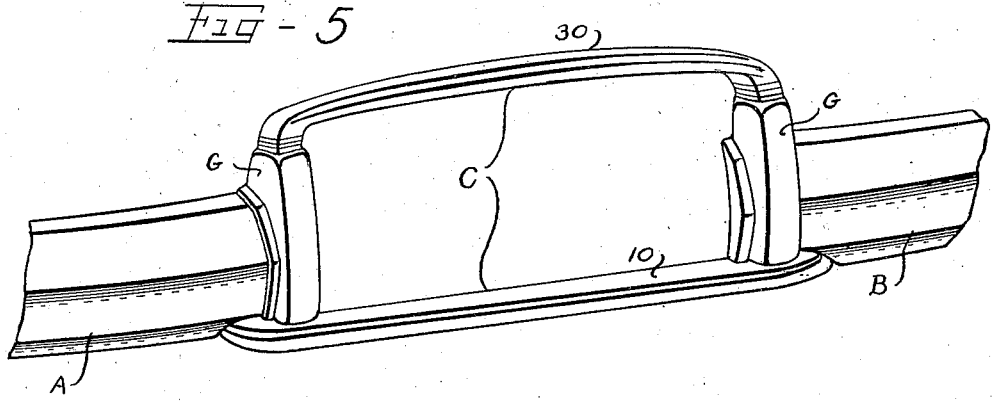
Figure 6:
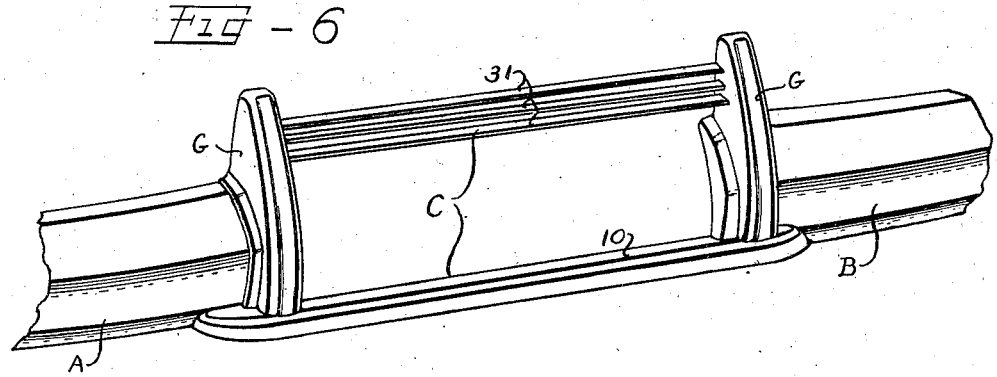

The various features of my invention are incorporated in the structure disclosed on the drawings, in which drawings:

Figure 1 is a plan view of the bumper structure;
Figure 2 is an enlarged front elevation;
Figure 3 is a section on plane III—III Figure 2;
Figure 4 is a front elevation of the middle part of the bumper structure showing a modified arrangement; and
Figures 5 and 6 are perspective views showing other modified arrangements.

The bumper structure shown comprises the end impact portions A and B, and the middle or intervening structure C. The end impact portions are in the form of steel plates curved or bowed longitudinally, and transversely curved to present substantially convex front faces.

The middle impact structure comprises one or more bars 10 extending between and secured at their ends to the inner end of the end portions A and B. Figures 1 to 3 show one such middle bar and the invention comprises improved means for securing the middle bar to the end impact portions. Vertical guards G may be attached at the junctures of the end impact portions and the middle bars.

Referring to Figures 1 to 3, each end impact portion at its inner lower corner has a longitudinally extending portion deflected rearwardly and upwardly to provide a horizontally extending ledge or shelf 11 to which the corresponding end of a middle impact bar 10 is secured. The middle impact bar shown is of channel shape, the end of its upper leg 12 being secured against the underside of the supports 11 as by bolts 13. Instead of using bolts, the securing could be by means of rivets or by means of welding, and the end impact portions A and B and the middle impact bar 10 will thus be rigidly secured together to form a continuous impact bar structure extending transversely of the automobile. The supporting shelves 11 may be of such height that the major portion of the bar 10 will be below the level of the lower edges of the end impact portions, and the front wall or yoke 14 of the bar may be flexed longitudinally to present a substantially convex outer face as shown on Figure 3.

Where the impact bar structure forms part of a front bumper on an automobile, the gap between the inner ends of the end impact portions A and B will be in front of the radiator and the radiator grille, and as the middle impact bar 10 is of comparatively small vertical height, it will not interfere with the free passage of air to the radiator for proper cooling purposes. The middle bar 10 being of channel shape will resist bending under impact by bumpers of other cars. In order to strengthen the resistance against bodily rearward movement of the impact bar structure under impact, and so protect the radiator grille, I use improved supporting structure for the impact bar assembly. Referring to Figure 1, a supporting bar H is provided for each end of the impact bar assembly. Each bar comprises a comparatively short portion 15 for receiving clamping or other securing structure, such as bolts, for securing the bar to the vehicle chassis. From the inner end of this supporting portion 15 of the bar, the S-shaped portion 16 extends forwardly with its front end 16′ extending laterally inwardly and provided with a bolt hole 17 for receiving a bolt 18 which extends through a bolt hole 19 adjacent to the inner end of the respective end impact portion of the impact assembly for securing this end to the end of the supporting bar. The outer end 20 of the supporting bar H extending from the supporting portion 15 thereof inclines forwardly and at its end is secured to the outer end of the respective end impact portion of the impact assembly, as by a bolt 21. The inner S-shaped portions of the supporting bars H form comparatively stiff springs which will resist bodily inward shift of the impact bar assembly under impact so that under ordinary bumps or blows the impact bar assembly cannot be forced rearwardly sufficiently for hitting the radiator grille structure. The comparatively long outer ends 20 of the supporting bar structures H will be more yielding to bumps against the outer portion of the impact bar assembly.

Where vertical guard structures G are added to the bumper assembly, they are preferably applied at the inner ends of the end impact portions A and B. The guard elements shown are of channel shape with their rear edges recessed to fit the convex front face curvature of the end impact portions A and B, and preferably lateral flanges 22 and 23 are provided paralleling the recessed edges and to increase the contact or seating area of the guards with the impact portions A and B. The vertical guards may be secured in any suitable manner. As shown, the bolts 18 may be of sufficient length to include the guards so that the guards and the inner ends of the end impact portions are rigidly secured to the front ends of the S-shaped portions of the supporting bars H.

The lower ends of the guard G may be shaped to seat against the inclined upper portion of the middle impact bar 10, and the inner flanges 23 of the guards may be extended rearwardly to provide side walls 24 covering or shielding the inner ends of the end impact portions A and B. The outer ends 10' of the bar 10 may be tapered off to fit against the tapered back walls 11' of the deflected support portions 11. A neat appearance is thus provided and sharp corners are eliminated.

It will be noted that the guards G are in front of and substantially in alignment with the S-shaped spring portions 16 of the supporting bars H and these comparatively stiff spring portions will resist rearward movement of the bumper impact structure and the guards so as to prevent contact thereby with the radiator grille structure, under heavy impact blows.

Auxiliary vertical guard structures I may be provided at the outer ends of the end impact portions A and B, for protecting the fenders and lamps of the vehicle. These auxiliary guard structures may be conveniently mounted on horizontally extending supporting shelves 25 formed by deflecting portions of the bars A and B rearwardly. The auxiliary guards may be secured to the supporting shelves in any suitable manner, as by bolts or rivets 26, or may be spot welded in place. The auxiliary guards may be of any suitable design and may be in the form of castings or formed of sheet metal.

Figure 4 shows an upper middle bar 27 between the ends of the end impact portions A and B. This bar 27 may be similar to the bar 10 of Figures 1 to 3, and for support of the bar 27 the upper inner corner portions of the bars A and B may be deflected downwardly and rearwardly to provide the horizontally extending supporting shelves 28 to which the bar 27 will be secured by welding, riveting, or, as shown, by bolts 29. This added, upper middle bar, will increase the strength of the middle portion of the impact structure but will leave this structure open for the free passage of air to the radiator. With this additional upper bar, the vertical guards G, if applied, would be shaped to fit the front curvature or profile of the bars.

Instead of securing the auxiliary or upper middle bar directly to the ends of the impact bar portions A and B, such auxiliary middle bar structure could be secured to and supported by the guard structures G. Figure 5 shows an auxiliary upper middle bar structure 30 secured to and extending between the tops of the vertical guards G, while Figure 6 shows a number of vertically spaced bars 31 secured to and extending between the inner side walls of the guards G, and with the bars 31 arranged edgewise for minimum resistance to air flow to the radiator. In the various modified arrangements, the lower middle bar 10 rigidly secured to the end impact portions A and B forms with such portions a continuous impact bar structure, and additional auxiliary middle bar structure, or vertical guards, or guard and auxiliary middle bar assemblies may be provided as desired. As before explained, the structure between the inner ends of the end impact portions A and B protects the grille and radiator structure without materially interfering with the air flow to the radiator, and the comparatively stiff spring portions 16 of the supporting bar structures H will permit rearward give of the impact structure but will resist excessive rearward movement thereof for preventing contact with the grille structure and mutilation thereof under heavy impact blows.

I have shown practical and efficient embodiments of the various features of my invention but I do not desire to be limited to the exact construction and arrangement shown and described, as changes and modifications may be made without departing from the scope of the invention.

I claim as follows:

1. An automobile bumper structure comprising two end impact bars horizontally aligned and spaced apart at their inner ends and being disposed in substantially vertical planes, a longitudinally extending portion adjacent the lower edge of each bar at the inner end thereof being deflected to form a horizontal seat, a middle bar extending horizontally between the inner ends of said end impact bars and secured at its ends against the undersides of said seats, vertical guard members seating on the ends of said middle bar and secured against the front faces of said end bars at the inner ends thereof, a longitudinally extending portion along the upper edge of each end impact bar and adjacent to the outer end thereof being deflected rearwardly to provide a horizontal seat, and other vertically extending guards mounted on said end seats.

2. An impact bar assembly for automobile bumpers comprising horizontally extending end portions each in the form of a single plate comparatively wide vertically, each plate having at its lower inner corner a portion thereof of comparatively short longitudinal extent deflected rearwardly and upwardly to provide a flat horizontal supporting shelf, and a middle bar of channel shape extending horizontally between the inner ends of said plates with its yoke in a vertical plane and with its upper flange at its ends engaging against the under sides of said supporting shelves, and means for rigidly securing said middle bar upper flanges to said shelves whereby said end plates and said middle bar will form a rigid impact bar structure.

3. An impact bar assembly for automobile bumpers comprising horizontally extending end portions each in the form of a single plate comparatively wide vertically, each plate having at its lower inner corner a portion thereof of comparatively short longitudinal extent deflected rearwardly and upwardly to provide a flat horizontal supporting shelf, and a middle bar of channel shape extending horizontally between the inner ends of said plates with its yoke in a vertical plane and with its upper flange at its ends engaging against the under sides of said supporting shelves, and means for rigidly securing said middle bar upper flanges to said shelves whereby said end plates and said middle bar will form a rigid impact bar structure, and vertical guard members seating against said middle bar and the front faces of said end plates at the inner ends thereof and secured to said end plates.

4. An impact bar assembly for automobile bumpers comprising horizontally extending end portions each in the form of a single plate comparatively wide vertically, each plate having at its lower inner corner a portion thereof of comparatively short longitudinal extent deflected rearwardly and upwardly to provide a flat horizontal supporting shelf, and a middle bar of channel shape extending horizontally between the inner ends of said plates with its yoke in a vertical plane and with its upper flange at its ends engaging against the under sides of said supporting shelves, and means for rigidly securing said middle bar upper flanges to said shelves whereby said end plates and said middle bar will form a rigid impact bar structure, and vertical guard members seating against said middle bar and the front faces of said end plates at the inner ends thereof and secured to said end plates, said vertical guard members having flanges on their inner sides projecting along the inner ends of said end plates to form covers therefor.

HERBERT S. JANDUS.